United States Patent
Takahashi

(10) Patent No.: US 9,544,864 B1
(45) Date of Patent: Jan. 10, 2017

(54) DATA TRANSMISSION SYSTEM AND RECEIVING DEVICE

(71) Applicant: Panasonic Liquid Crystal Display Co., Ltd., Hyogo (JP)

(72) Inventor: Kouji Takahashi, Chiba (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 15/062,197

(22) Filed: Mar. 7, 2016

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)
*H04W 56/00* (2009.01)

(52) U.S. Cl.
CPC .................. *H04W 56/0015* (2013.01)

(58) Field of Classification Search
CPC .......... H04L 27/2647; H04L 1/20; H04L 1/06; H04L 25/0204; H04B 1/1027; H04B 1/123; H04B 1/1036; H04B 7/002; H04B 1/109
USPC ................. 375/219–220, 229–236, 286–294,375/316–352
See application file for complete search history.

(56) References Cited

U.S. PATENT DOCUMENTS

| | | | | | |
|---|---|---|---|---|---|
| 2,647,994 | A | * | 8/1953 | Weiss | G01S 7/28 331/4 |
| 3,473,131 | A | * | 10/1969 | Perkins, Jr. | H03K 5/086 327/178 |
| 3,578,914 | A | * | 5/1971 | Simonelli | H04L 25/03885 333/18 |
| 3,665,311 | A | * | 5/1972 | Gargini | H04N 7/106 340/536 |
| 3,868,519 | A | * | 2/1975 | Green | H04L 25/00 327/108 |
| 4,429,384 | A | * | 1/1984 | Kaplinsky | G06F 13/374 340/12.16 |
| 4,888,764 | A | * | 12/1989 | Haug | H04L 12/40 375/219 |
| 5,130,793 | A | * | 7/1992 | Bordry | H04N 7/10 348/E7.049 |

(Continued)

FOREIGN PATENT DOCUMENTS

JP  2013-128190  6/2013

*Primary Examiner* — James M Perez
(74) *Attorney, Agent, or Firm* — Hubbs, Enatsky & Inoue PLLC

(57) ABSTRACT

Provided is a data transmission system, including: a transmitting device configured to transmit a data signal; a receiving device configured to receive the transmitted data signal; and a transmission path for transmitting the data signal, the receiving device including: a detection unit configured to detect a timing at which a polarity of the received data signal is inverted; a plurality of resistors to be selectively connected to a terminal side of the transmission path; and a switching unit configured to switch the plurality of resistors based on the detected timing, the switching unit being configured to select a resistor having a higher resistance value than a characteristic impedance of the transmission path, during a first period, which is a predetermined period from a time point at which the polarity is inverted, and to select, after the first period, a resistor having the same resistance value as the characteristic impedance.

7 Claims, 7 Drawing Sheets

(56) References Cited

U.S. PATENT DOCUMENTS

| | | | | |
|---|---|---|---|---|
| 5,317,597 A * | 5/1994 | Eisele | H04L 25/0272 | 375/257 |
| 5,528,166 A * | 6/1996 | Iikbahar | H03K 19/00361 | 326/27 |
| 5,589,844 A * | 12/1996 | Belcher | H01Q 23/00 | 333/17.3 |
| 5,901,340 A * | 5/1999 | Flickinger | H03H 11/34 | 348/E7.049 |
| 6,185,263 B1 * | 2/2001 | Chan | H04B 3/02 | 375/257 |
| 6,724,890 B1 * | 4/2004 | Bareis | H04M 1/76 | 379/394 |
| 7,135,884 B1 * | 11/2006 | Talbot | H03K 17/164 | 326/30 |
| 7,142,014 B1 * | 11/2006 | Groen | H03K 19/215 | 326/55 |
| 7,199,728 B2 * | 4/2007 | Dally | H04L 25/4904 | 341/100 |
| 7,355,438 B2 * | 4/2008 | El Sayed | H04L 12/40 | 326/30 |
| 7,633,318 B2 * | 12/2009 | Kim | G11C 7/1078 | 327/54 |
| 7,697,628 B2 * | 4/2010 | Choi | H04L 25/085 | 341/55 |
| 7,920,402 B2 * | 4/2011 | Katoh | G11C 11/5685 | 365/100 |
| 7,983,347 B2 * | 7/2011 | Hamada | H04L 25/0272 | 375/244 |
| 8,004,330 B1 * | 8/2011 | Acimovic | H03K 19/00361 | 327/108 |
| 8,022,723 B1 * | 9/2011 | Wang | H04L 25/0278 | 326/30 |
| 8,102,696 B2 * | 1/2012 | Katoh | G11C 13/00 | 365/148 |
| 8,190,109 B2 * | 5/2012 | Ali | H01Q 1/243 | 455/123 |
| 8,358,156 B1 * | 1/2013 | Abugharbieh | H03K 19/017554 | 327/108 |
| 8,446,977 B2 * | 5/2013 | Ovchinnikov | H04B 3/50 | 375/257 |
| 8,472,532 B2 * | 6/2013 | Schley-May | H04B 3/02 | 375/257 |
| 8,620,236 B2 * | 12/2013 | Manssen | H01L 28/20 | 455/115.1 |
| 8,948,889 B2 * | 2/2015 | Manssen | G05B 13/02 | 455/77 |
| 9,184,960 B1 * | 11/2015 | Harel | H04L 25/03006 | |
| 2002/0150116 A1 * | 10/2002 | Huang | H04B 3/548 | 370/431 |
| 2003/0025514 A1 * | 2/2003 | Benes | G01R 15/09 | 324/713 |
| 2003/0169374 A1 * | 9/2003 | Cole | H04N 7/108 | 348/621 |
| 2004/0119495 A1 * | 6/2004 | Grillo | H04L 25/085 | 326/21 |
| 2004/0189381 A1 * | 9/2004 | Louis | H03F 1/0266 | 330/124 R |
| 2005/0198687 A1 * | 9/2005 | Miller | H04N 7/108 | 725/127 |
| 2006/0009165 A1 * | 1/2006 | Alles | H04B 1/44 | 455/88 |
| 2006/0098804 A1 * | 5/2006 | Larzabal | H04B 3/36 | 379/346 |
| 2006/0165195 A1 * | 7/2006 | Dally | H04L 25/4904 | 375/316 |
| 2008/0076373 A1 * | 3/2008 | Takahashi | H03G 3/3078 | 455/249.1 |
| 2008/0186407 A1 * | 8/2008 | Miller | H04N 5/268 | 348/705 |
| 2009/0231913 A1 * | 9/2009 | Tonomura | G11C 7/04 | 365/163 |
| 2010/0238706 A1 * | 9/2010 | Tokiwa | G11C 13/0004 | 365/148 |
| 2010/0259968 A1 * | 10/2010 | Tsushima | G11C 13/0064 | 365/148 |
| 2010/0271144 A1 * | 10/2010 | McCorquodale | H03B 5/04 | 331/117 FE |
| 2010/0284452 A1 * | 11/2010 | Allen | H04L 7/0008 | 375/220 |
| 2011/0254638 A1 * | 10/2011 | Manssen | H03H 7/40 | 333/109 |
| 2011/0291754 A1 * | 12/2011 | Reddy | H03F 1/0277 | 330/124 R |
| 2012/0068618 A1 * | 3/2012 | Koski | H05B 33/0851 | 315/240 |
| 2012/0134394 A1 * | 5/2012 | Allen | H04L 7/0008 | 375/219 |
| 2012/0228927 A1 * | 9/2012 | Matsumoto | H04B 3/548 | 307/3 |
| 2012/0300870 A1 * | 11/2012 | Dickey | H04L 27/12 | 375/295 |
| 2013/0154897 A1 * | 6/2013 | Sorensen | H01Q 7/005 | 343/861 |
| 2013/0207234 A1 * | 8/2013 | Ikeda | H01L 28/20 | 257/536 |
| 2013/0307583 A1 * | 11/2013 | Hollis | H03K 19/0005 | 326/30 |
| 2015/0076994 A1 * | 3/2015 | Rezeanu | H05B 37/0254 | 315/155 |
| 2015/0223306 A1 * | 8/2015 | Rezeanu | H05B 37/0254 | 315/200 R |

* cited by examiner

DATA TRANSMISSION SYSTEM AND RECEIVING DEVICE

BACKGROUND

1. Technical Field

This application relates to a data transmission system and a receiving device.

2. Description of the Related Art

Hitherto, in high-speed serial data transmission, there has been known a problem in that a data signal transmitted from a transmitting device (source device) is affected by the characteristics of a transmission path to cause the deterioration of an eye pattern of the data signal, resulting in signal quality degradation. Regarding this problem, a technology called "pre-emphasis" has been proposed as a technology for improving the eye pattern of the data signal (Japanese Patent Application Laid-open No. 2013-128190).

SUMMARY

However, in the related art, the transmitting device needs a complex circuit in order to perform pre-emphasis. As a result, there are problems in that, in the transmitting device, the complexity of circuit configuration and an increase in power consumption of the circuit may be caused, and an increase in electromagnetic interference (EMI) of the data signal may also be caused.

This application has been made in view of the above-mentioned problems. It is an object of this application to provide a data transmission system capable of reducing power consumption and of improving the quality of a data signal based on a simple configuration.

In order to solve the above-mentioned problems, a data transmission system according to one embodiment of the present application includes: a transmitting device configured to transmit a data signal; a receiving device configured to receive the data signal transmitted from the transmitting device; and a transmission path for transmitting the data signal from the transmitting device to the receiving device, the receiving device including: a detection unit configured to detect a timing at which a polarity of the received data signal is inverted; a plurality of resistors to be selectively connected to a terminal side of the transmission path; and a switching unit configured to switch the plurality of resistors based on the detected timing. The switching unit is configured to select a resistor of the plurality of resistors, the resistor having a higher resistance value than a characteristic impedance of the transmission path, during a first period, which is a predetermined period from a time point at which the polarity is inverted, and to select a resistor of the plurality of resistors, the resistor having the same resistance value as the characteristic impedance, during a second period, which is a period from an end point of the first period until the polarity is inverted next.

In the data transmission system according to the one embodiment, in the received data signal, a signal level of the first period may be higher than a signal level of the second period.

In the data transmission system according to the one embodiment, during the first period, the signal level of the first period may be controlled to be higher than the signal level of the second period by causing the transmitted data signal to be reflected at a terminus of the transmission path.

In the data transmission system according to the one embodiment, impedance mismatching processing may be performed during the first period and impedance matching processing may be performed during the second period.

In the data transmission system according to the one embodiment, the transmission path may include a first transmission line and a second transmission line, and the data signal may be a differential signal to be transmitted along the first transmission line and the second transmission line.

In the data transmission system according to the one embodiment, a resistor having the same resistance value as the characteristic impedance may be connected to a terminus of the transmission path on the transmitting device side.

Further, in order to solve the above-mentioned problems, a receiving device according to one embodiment includes: a receiving unit configured to receive a data signal transmitted from a transmitting device via a transmission path; a detection unit configured to detect a timing at which a polarity of the received data signal is inverted; a plurality of resistors to be selectively connected to a terminal side of the transmission path; and a switching unit configured to switch the plurality of resistors based on the detected timing. The switching unit is configured to select a resistor of the plurality of resistors, the resistor having a higher resistance value than a characteristic impedance of the transmission path, during a first period, which is a predetermined period from a time point at which the polarity is inverted, and to select a resistor of the plurality of resistors, the resistor having the same resistance value as the characteristic impedance, during a second period, which is a period from an end point of the first period until the polarity is inverted next.

DETAILED DESCRIPTION

Figure 1:
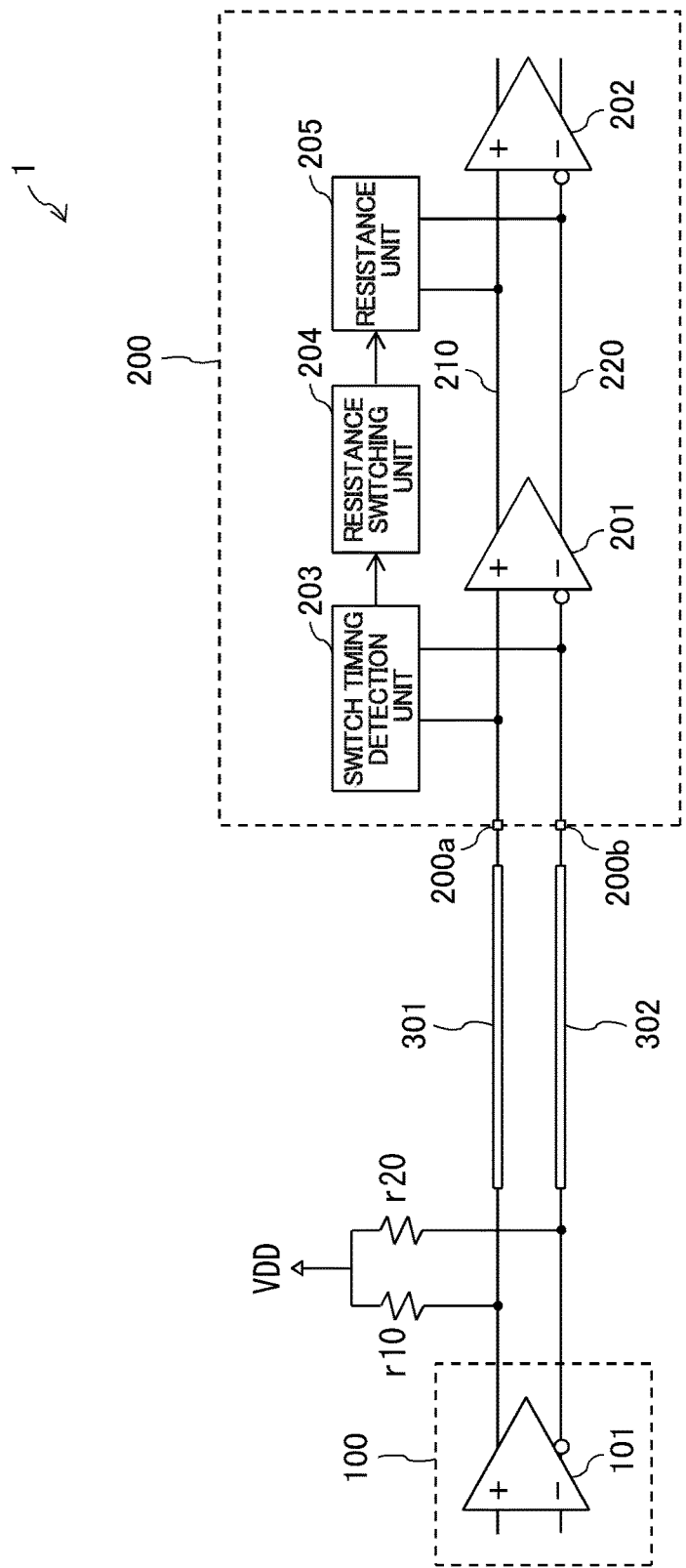
FIG. 1 is a block diagram for illustrating a functional configuration of a data transmission system according to an embodiment of this application.

An embodiment of this application is now described with reference to the drawings. FIG. 1 is a block diagram for illustrating a functional configuration of a data transmission system according to the embodiment of this application. A data transmission system 1 according to this embodiment includes a transmitting device 100 (source device) configured to transmit a data signal and a receiving device 200 (sink device) configured to receive the data signal. The transmitting device 100 and the receiving device 200 each include a predetermined interface supporting a DisplayPort (DP) standard, for example. Further, the transmitting device 100 and the receiving device 200 are connected to each other via a transmission path. For example, the transmitting device 100 and the receiving device 200 are connected to each other via a first data transmission line 301 and a second data transmission line 302 for transmitting differential signals (data signals). The first data transmission line 301 and the second data transmission line 302 each have a particular characteristic impedance Z0. Note that, in the above-mentioned transmission path according to this embodiment, the first data transmission line 301 and the second data transmission line 302 may each have a characteristic impedance of 50Ω, for example, and a pair of transmission lines including the first data transmission line 301 and the second data transmission line 302 may have a differential impedance of 100Ω. Further, the transmission lines including the first data transmission line 301 and the second data transmission line 302 may be constructed from two coaxial cables, or constructed from one twisted-pair cable.

The transmitting device 100 includes a source driver 101. The source driver 101 is configured to generate and output a differential signal (data signal). A power supply voltage and the like (not shown) are input to the source driver 101. The first data transmission line 301 is connected to an output terminal on the positive electrode side of the source driver 101, and the second data transmission line 302 is connected to an output terminal on the negative electrode side of the source driver 101. A resistor r10 is connected to a terminus of the first data transmission line 301 on the transmitting device 100 side, and a resistor r20 is connected to a terminus of the second data transmission line 302 on the transmitting device 100 side. The resistance value of the resistor r10 and the resistance value of the resistor r20 are each set to the same resistance value R0. The resistance value R0 is set to the same resistance value as the characteristic impedance Z0 (R0=Z0). Note that, the meaning of "same resistance value" is not limited to cases in which R0=Z0. Cases in which a difference between the resistance value R0 and the characteristic impedance Z0 is within ±5% are still included in the definition of "same resistance value". A known configuration, for example, may be employed for the transmitting device 100.

The receiving device 200 includes receiving units 200a and 200b, a receiving driver 201, a buffer circuit 202, a switch timing detection unit 203, a resistance switching unit 204, and a resistance unit 205. The receiving driver 201 is configured to receive the differential signal (data signal) transmitted from the transmitting device 100 via the receiving units 200a and 200b. The first data transmission line 301 is connected to the receiving unit 200a and an input terminal on the positive electrode side of the receiving driver 201, and the second data transmission line 302 is connected to the receiving unit 200b and an input terminal on the negative terminal side of the receiving driver 201. One end of the resistance unit 205 is connected to a terminus of the first data transmission line 301 on the receiving device 200 side via the switch timing detection unit 203 and the resistance switching unit 204. Another end of the resistance unit 205 is connected to a terminus of the second data transmission line 302 on the receiving device 200 side via the switch timing detection unit 203 and the resistance switching unit 204. The terminus of the first data transmission line 301 on the receiving device 200 side is connected to one of the input terminals of the switch timing detection unit 203, and the terminus of the second data transmission line 302 on the receiving device 200 side is connected to another of the input terminals of the switch timing detection unit 203. An output terminal on the positive electrode side of the receiving driver 201 is connected to an input terminal on the positive electrode side of the buffer circuit 202 via a first wire 210, and an output terminal on the negative electrode side of the receiving driver 201 is connected to an input terminal on the negative electrode side of the buffer circuit 202 via a second wire 220. One end of the resistance unit 205 is connected to the first wire 210, and another end of the resistance unit 205 is connected to the second wire 220.

Figure 2:
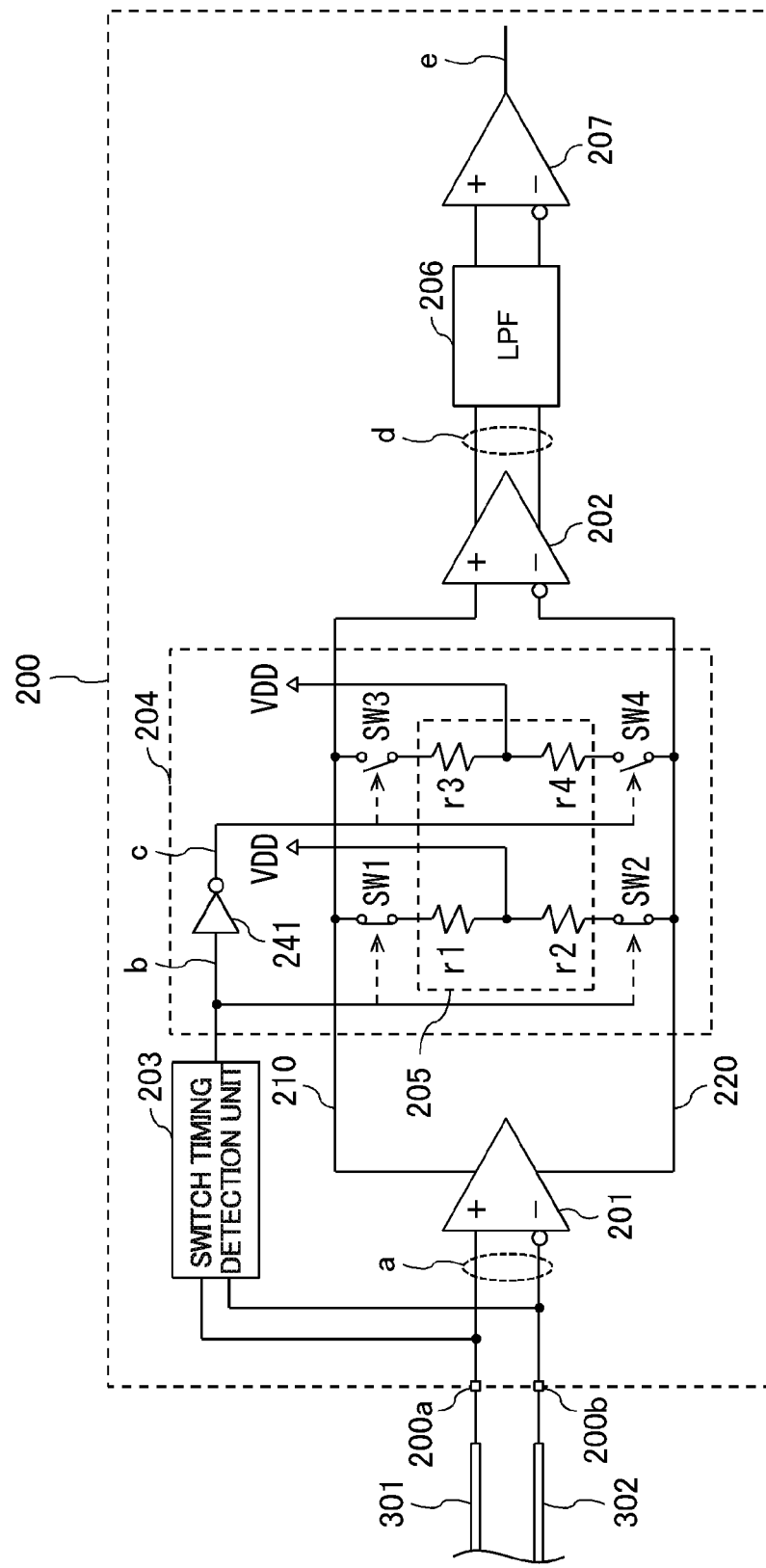
FIG. 2 is a circuit diagram for illustrating a specific configuration of a receiving device according to the embodiment of this application.

FIG. 2 is a circuit diagram for illustrating a specific configuration of the receiving device 200. The resistance switching unit 204 includes a first switch SW1, a second switch SW2, a third switch SW3, a fourth switch SW4, and an inverter circuit 241. The resistance unit 205 includes a first resistor r1, a second resistor r2, a third resistor r3, and a fourth resistor r4. One end of the first switch SW1 is connected to the first wire 210, and another end of the first switch SW1 is connected to one end of the first resistor r1. An output signal from the switch timing detection unit 203 (hereinafter referred to as "detection signal") is input to a control terminal of the first switch SW1. One end of the second switch SW2 is connected to the second wire 220, and another end of the second switch SW2 is connected to one end of the second resistor r2. The above-mentioned detection signal from the switch timing detection unit 203 is input to a control terminal of the second switch SW2. Another end of the first resistor r1 and another end of the second resistor r2 are connected to a power supply VDD.

One end of the third switch SW3 is connected to the first wire 210, and another end of the third switch SW3 is connected to one end of the third resistor r3. An inverted signal of the above-mentioned detection signal of the switch timing detection unit 203 (hereinafter referred to as "inverted detection signal") is input to a control terminal of the third switch SW3. One end of the fourth switch SW4 is connected to the second wire 220, and another end of the fourth switch SW4 is connected to one end of the fourth resistor r4. The above-mentioned inverted detection signal of the switch timing detection unit 203 is input to a control terminal of the fourth switch SW4. Another end of the third resistor r3 and another end of the fourth resistor r4 are connected to the power supply VDD.

The switch timing detection unit 203 is configured to detect a polarity inversion timing of the data signal received by the receiving device 200 at the terminus of the first data transmission line 301 and at the terminus of the second data transmission line 302. The switch timing detection unit 203 is configured to output a high-level detection signal during a predetermined period T1 (first period) when the above-mentioned polarity inversion timing is detected, and to output a low-level detection signal during a period in which the above-mentioned polarity inversion timing is not detected (second period). The inverter circuit 241 is configured to output the high-level detection signal when the low-level detection signal is input, and to output the low-level detection signal when the high-level detection signal is input.

When the above-mentioned low-level detection signal is output from the switch timing detection unit 203 and input to the resistance switching unit 204, the first switch SW1 and the second switch SW2 switch to an OFF state, and the third switch SW3 and the fourth switch SW4 switch to an ON state. As a result, the third resistor r3 and the fourth resistor r4 are connected to the terminus of the first data transmission line 301 and the terminus of the second data transmission line 302. On the other hand, when the above-mentioned high-level detection signal is output from the switch timing detection unit 203 and input to the resistance switching unit 204, the first switch SW1 and the second switch SW2 switch to an ON state, and the third switch SW3 and the fourth switch SW4 switch to an OFF state. As a result, the first resistor r1 and the second resistor r2 are connected to the terminus of the first data transmission line 301 and the terminus of the second data transmission line 302.

In this case, the resistance value of the third resistor r3 and the resistance value of the fourth resistor r4 are each set to the same resistance value R1. The resistance value R1 is set to the same resistance value as the characteristic impedance Z0 (R1=Z0). Note that, the meaning of "same resistance value" is not limited to cases in which R1=Z0. Cases in which a difference between the resistance value R1 and the characteristic impedance Z0 is within ±5% are still included in the definition of "same resistance value". The resistance value of the first resistor r1 and the resistance value of the second resistor r2 are each set to the same resistance value R2. The resistance value R2 is set to a higher resistance value than the characteristic impedance Z0 (R2>Z0). For example, the characteristic impedance Z0, the resistance value R0 of the resistor r10 and the resistor r20, and the resistance value R1 of the third resistor r3 and the fourth resistor r4 are set to 50Ω (Z0=R0=R1=50Ω), and the resistance value R2 of the first resistor r1 and the second resistor r2 is set to 100Ω (R2=100Ω>Z0). The resistance switching unit 204 is configured to select, during the predetermined period T1 (first period) from the time point at which the polarity of the data signal received by the receiving device 200 is inverted, the resistors (first resistor r1 and second resistor r2) having a higher resistance value than the characteristic impedance Z0 that the first data transmission line 301 and the second data transmission line 302 have, and during a period (second period) from after the predetermined period T1 has elapsed until the polarity is inverted next, the resistors (third resistor r3 and fourth resistor r4) having the same resistance value as the characteristic impedance Z0.

With the configuration described above, during the predetermined period T1 from after inversion of the polarity of the data signal output from the transmitting device 100, resistors (first resistor r1 and second resistor r2) having a higher resistance value than the characteristic impedance Z0 are connected to the terminus of the first data transmission line 301 and the terminus of the second data transmission line 302. As a result, there is an impedance mismatch between the characteristic impedance Z0 and the resistance value R2, and this impedance mismatch causes a reflection to be produced. Therefore, during the predetermined period T1, an amplitude (reflection wave) of the reflected data signal (reflection signal) is added to the amplitude that is based on the data signal output from the transmitting device 100. After the predetermined period T1, because resistors (third resistor r3 and fourth resistor r4) having the same resistance value as the characteristic impedance Z0 are connected to the terminus of the first data transmission line 301 and the terminus of the second data transmission line 302, there is an impedance match, and hence a reflection is not produced. As a result, after the predetermined period T1, the amplitude decreases to the amplitude that is based on the data signal output from the transmitting device 100. In other words, the predetermined period T1 is a pre-emphasis period in which the amplitude increases. Thus, pre-emphasis can be realized by switching the terminus resistance at the receiving device 200. Note that, because resistors (resistor r10 and resistor r20) having the same resistance value as the characteristic impedance Z0 are connected to the terminus of the first data transmission line 301 and the terminus of the second data transmission line 302 on the transmitting device 100 side, there is an impedance match, and hence another reflection is not produced.

The receiving device 200 may also include, in addition to the parts described above, a known low-pass filter (LPF) 206 and a known differential/single-ended conversion circuit 207 configured to convert a differential signal into a single-ended signal.

Figure 3:
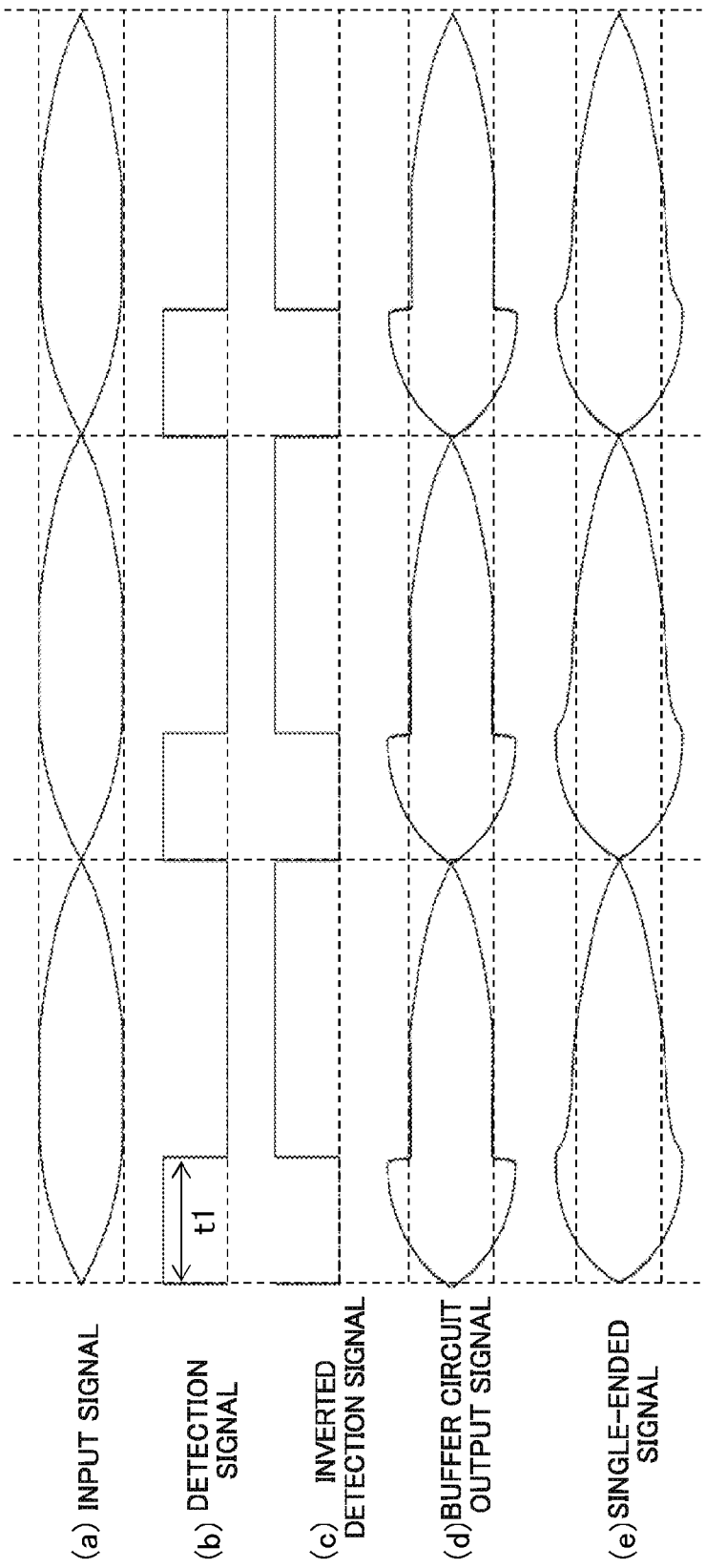
FIG. 3 is a schematic diagram for showing signal waveforms at predetermined positions of the receiving device.

FIG. 3 is a schematic diagram for showing signal waveforms at predetermined positions of the receiving device 200. Signal waveforms (a) to (e) shown in FIG. 3 correspond to the signal waveforms at points "a" to "e" illustrated in FIG. 2. The signal waveform (a) represents the waveform of the data signal (input signal) input to the receiving driver 201. The signal waveform (b) represents the waveform of the output signal (detection signal) from the switch timing detection unit 203. The signal waveform (c) represents the waveform of the inverted signal (inverted detection signal) of the above-mentioned detection signal. The signal waveform (d) represents the waveform of the output signal from the buffer circuit 202. The signal waveform (e) represents the waveform of the output signal (single-ended signal) from the differential/single-ended conversion circuit 207. Each of the signal waveforms (a), (d), and (e) shows an eye pattern.

As shown by the signal waveform (b) in FIG. 3, the switch timing detection unit 203 is configured to output, when the polarity inversion timing of the input signal (a) of the receiving driver 201 is detected, a high-level detection signal just during the predetermined period T1, which causes the first switch SW1 and the second switch SW2 to switch to an ON state, and the third switch SW3 and the fourth switch SW4 to switch to an OFF state. As a result, the first resistor r1 and the second resistor r2 having a higher resistance value than the characteristic impedance Z0 (R2>Z0) are connected to the terminus of the first data transmission line 301 and the terminus of the second data transmission line 302. This results in, as shown by the signal waveform (d) in FIG. 3, a reflection being produced during the predetermined period T1, which causes the amplitude of the output signal from the buffer circuit 202 to increase. After the predetermined period T1, the switch timing detection unit 203 is configured to output, during the period until the polarity inversion timing of the input signal (a) of the receiving driver 201 is detected, a low-level detection signal. This causes the first switch SW1 and the second switch SW2 to switch to an OFF state, and the third switch SW3 and the fourth switch SW4 to switch to an ON state. As a result, the third resistor r3 and the fourth resistor r4 having the same resistance value as the characteristic impedance Z0 (R1=Z0) are connected to the terminus of the first data transmission line 301 and the terminus of the second data transmission line 302. Consequently, there is an impedance match, and as shown by the signal waveform (d) in FIG. 3, the amplitude of the output signal from the buffer circuit 202 decreases to the original amplitude. The output signal from the buffer circuit 202 passes through the low-pass filter 206 and the differential/single-ended conversion circuit 207, and the single-ended signal shown by the signal waveform (e) in FIG. 3 is obtained. The switch timing detection unit 203 is capable of adjusting the length of the above-mentioned predetermined period T1. Therefore, the pre-emphasis period may be adjusted by adjusting the above-mentioned predetermined period T1.

With the configuration described above, the transmitting device 100 does not require a circuit for performing pre-emphasis. Further, pre-emphasis can be realized by switching the terminus resistance at the receiving device 200. As a result, power consumption can be reduced and the quality of the data signal can be improved with a simple configuration.

The data transmission system 1 according to this embodiment is not limited to the configuration described above. For example, the resistance unit 205 may include a resistor having the same resistance value as the characteristic impedance Z0 (R1=Z0), a resistor having a resistance value R2 higher than the characteristic impedance Z0 (R2>Z0), and a resistor having a resistance value R3 higher than the resistance value R2 (R3>R2). Further, the resistance switching unit 204 may be configured to switch the resistance during the predetermined period T1 (R2 or R3) based on, for example, the amplitude, transmission speed, frequency, and the like of the data signal. Thus, the number of resistors having a higher resistance value than the characteristic impedance Z0 is not limited.

Figure 4:
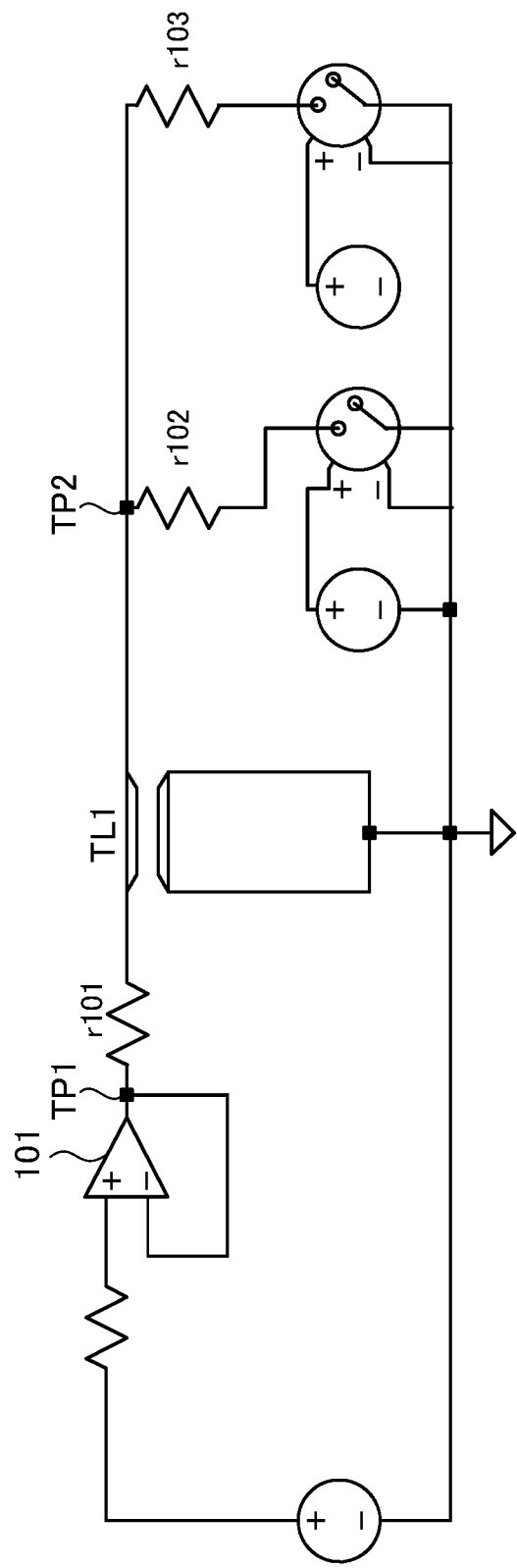
FIG. 4 is a circuit diagram of a circuit used in a simulation of the data transmission system according to the embodiment.
Figure 5:
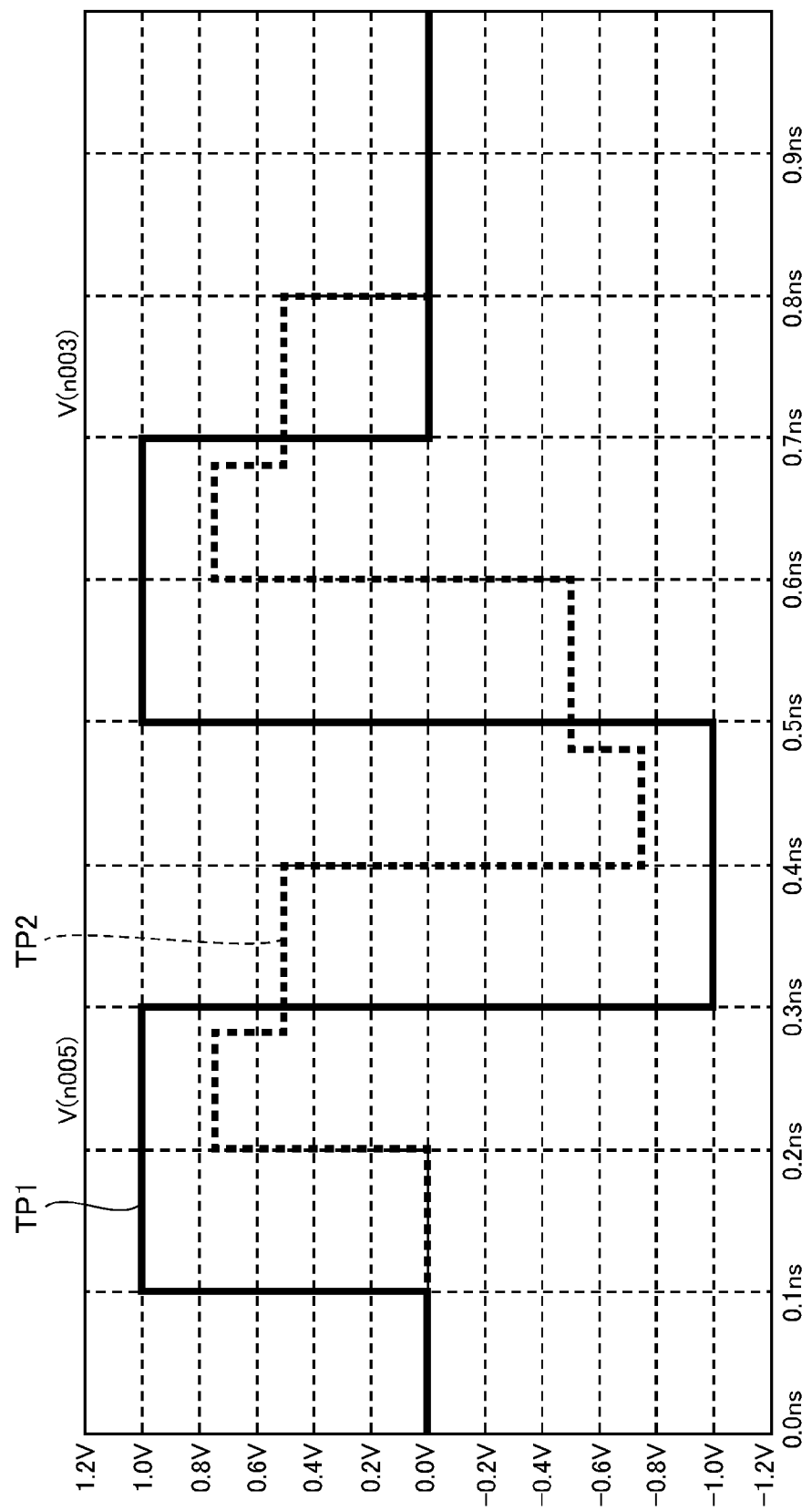
FIG. 5 is a signal waveform diagram for showing a result of the simulation.

Next, a result of a simulation run on the data transmission system 1 according to this embodiment is shown. FIG. 4 is a circuit diagram of a circuit used in the simulation. Note that, in this case, in order to facilitate the description, the simulation is run using a single-ended transmission method instead of a differential transmission method. FIG. 5 is a signal waveform diagram for showing a result of the simulation. A signal waveform TP1 shown in FIG. 5 represents the waveform of the output signal from the source driver 101 illustrated in FIG. 4, and a signal waveform TP2 shown in FIG. 5 represents the signal waveform at the terminus of a transmission line TL1 illustrated in FIG. 4.

In the simulation, the resistance value of a resistor r101 and the resistance value of a resistor r102 were each set to 100Ω, and the resistance value of a resistor r103 was set to 300Ω. Further, the transmission line TL1 is assumed to be a lossless transmission line having a characteristic impedance Z0 of 100Ω and a transmission time (delay time) Td of 100 ps. The output signal TP1 of the source driver shown in FIG. 5 was set as a rectangular wave having an amplitude of ±1 V, a frequency of 5 GHz, a unit interval (UI) of 200 ps, and a rise time Tr of 0.1 ps.

Under the above-mentioned conditions, during the 80 ps period (predetermined period T1) from after the inversion of the polarity of the output signal, the resistor r103 was connected to the transmission line TL1, and the terminus resistance was set to 300 Ω. After this period (predetermined period T1) had elapsed, the resistor r102 was connected to the transmission line TL1, and the terminus resistance was set to 100Ω. As a result, as shown by the signal waveform TP2 in FIG. 5, when the terminus resistance was set to 100Ω, at the terminus TP2 of the transmission line TL1, a waveform was obtained having ½ the amplitude (±0.5 V) of the ±1 V amplitude of the output signal TP1. Further, when the terminus resistance was set to 300Ω, because the reflection coefficient is ½, a reflection wave of 0.25 V was produced based on the amplitude of 0.5 V, and an amplitude of 0.75 V was obtained at the terminus TP2 of the transmission line TL1. This corresponds to a pre-emphasis level of about 3.5 dB. Note that, when the terminus of the transmission line TL1 was open, a pre-emphasis level of 6 dB, which is about twice as large, was obtained.

Figure 6:
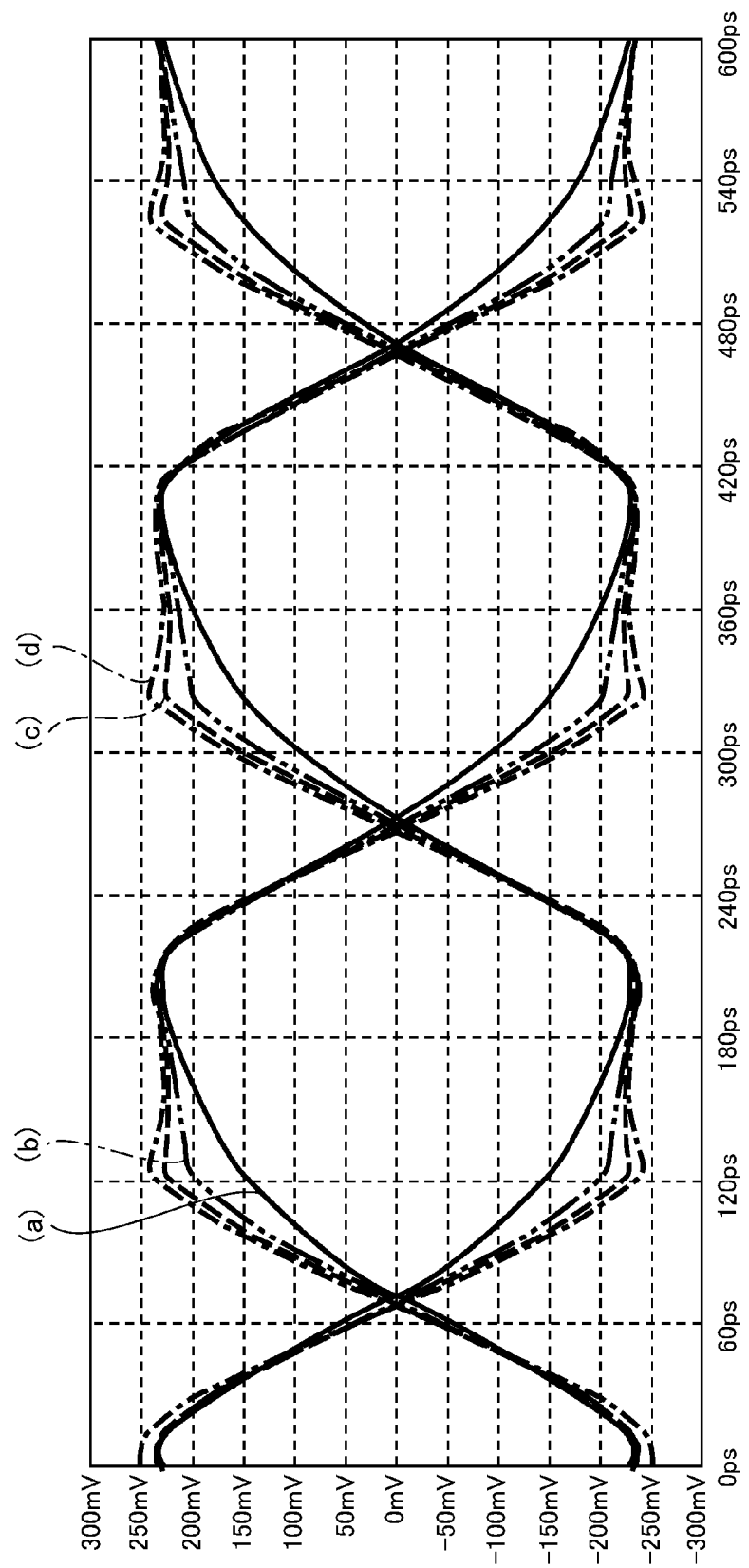
FIG. 6 is a signal waveform diagram for showing eye patterns of pseudorandom pulses transmitted along a transmission path illustrated in FIG. 4.

FIG. 6 is a signal waveform diagram for showing eye patterns of pseudorandom pulses transmitted along the transmission path illustrated in FIG. 4. The waveforms shown in FIG. 6 represent show cases in which in the circuit illustrated in FIG. 4, a low-pass filter (LPF) has been arranged at a subsequent stage of the source driver 101 in order to artificially produce waveform degradation. Further, the waveforms shown in FIG. 6 show results in which the transmission time (delay time) Td of the transmission line TL1 is 2 ns. In addition, the waveforms shown in FIG. 6 represent waveforms that have passed through an operational amplifier and the low-pass filter (LPF). In FIG. 6, eye patterns are shown for cases in which the terminus resistance during the 80 ps period (predetermined period T1) from after the inversion of the polarity of the pseudorandom pulse (output signal) was switched to 100Ω, 200Ω, 300Ω, and 400Ω. A waveform (a) in FIG. 6 represents an eye pattern when the terminus resistance was set to 100Ω. In this case, the pre-emphasis level is 0 dB. A waveform (b) in FIG. 6 represents an eye pattern when the terminus resistance was set to 200Ω. In this case, the pre-emphasis level was about 2.5 dB. A waveform (c) in FIG. 6 represents an eye pattern when the terminus resistance was set to about 300Ω. In this case, the pre-emphasis level is 3.5 dB. A waveform (d) in FIG. 6 represents an eye pattern when the terminus resistance was set to 400Ω. In this case, the pre-emphasis level is about 4.1 dB. Thus, it can be seen that switching the terminus resistance of the transmission line TL1 for just the predetermined period T1 to a higher resistance than the characteristic impedance Z0 enables a pre-emphasis level to be obtained, and the eye pattern to be improved. Further, it can also be seen that adjusting the resistance value of the terminus resistance enables the pre-emphasis level to be adjusted.

Note that, the pre-emphasis period can also be adjusted by adjusting the predetermined period T1 in the manner described above. Thus, because the pre-emphasis period and the pre-emphasis level can be adjusted to desired values, the eye pattern can be improved, and hence the quality of the data signal can be improved.

Note that, in the above-mentioned configuration, an example is described in which a differential signal is the signal transmitted between the transmitting device 100 and the receiving device 200. However, the data transmission system' according to this embodiment is not limited to a differential transmission method. For example, the data transmission system 1 according to this embodiment may be a data transmission system that employs a single-ended transmission method, in which the data signal is transmitted between the transmitting device 100 and the receiving device 200 via a single transmission line (transmission path).

Figure 7:
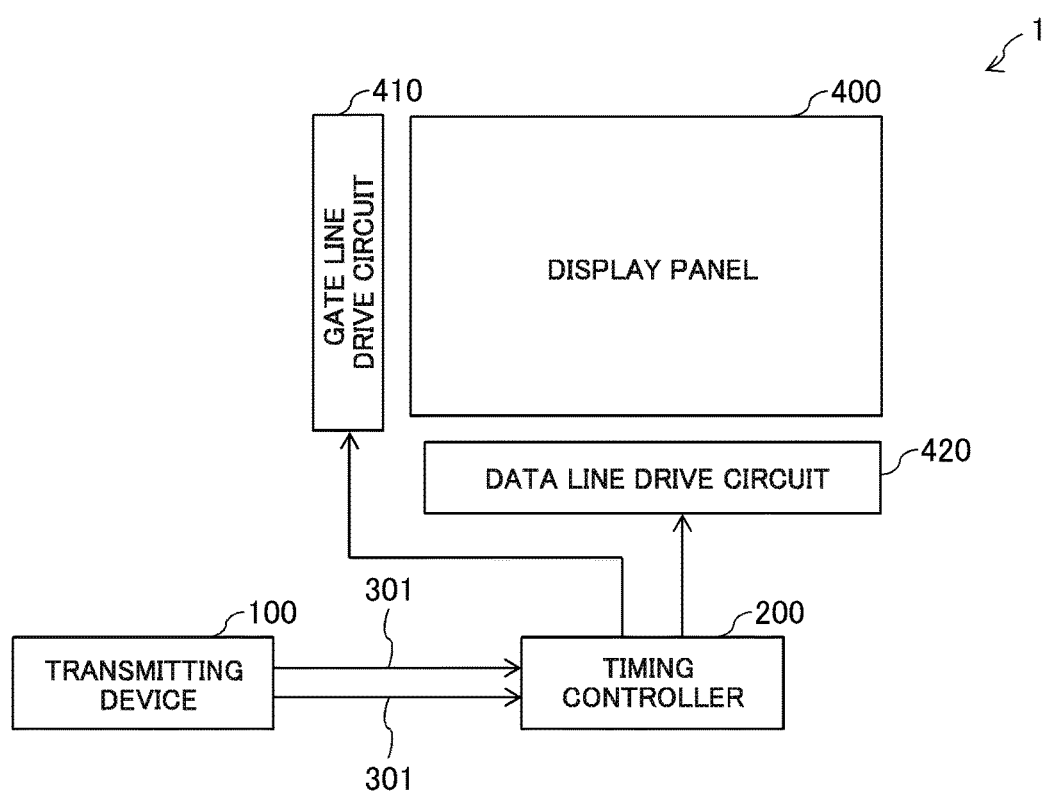
FIG. 7 is a block diagram for illustrating an example of a case in which the data transmission system is applied in a display device.

FIG. 7 is a block diagram for illustrating an example of a case in which the data transmission system 1 is applied in a display device. The data transmission system 1 includes the transmitting device 100, a timing controller serving as the receiving device 200, a display panel 400, and a gate line drive circuit 410 and a data line drive circuit 420 configured to drive the display panel 400. A known configuration may be employed for the display panel 400, the gate line drive circuit 410, and the data line drive circuit 420. In the above-mentioned configuration, the transmitting device 100 is configured to transmit a video signal (data signal) to the timing controller 200 via a transmission path (first data transmission line 301 and second data transmission line 302). The timing controller 200 is configured to perform the above-mentioned pre-emphasis processing and known image processing on the received video signal. The display panel 400 is configured to display video based on the video signal, a control signal, and the like output from the timing controller 200. With the above-mentioned configuration, because the quality of the video signal can be improved, the display quality can be improved.

Note that, the data transmission system 1 may be applied not only to a display device, and the data transmission system 1 may also be applied in other electronic devices.

While there have been described what are at present considered to be certain embodiments of the application, it will be understood that various modifications may be made thereto, and it is intended that the appended claims cover all such modifications as fall within the true spirit and scope of the invention.

What is claimed is:

1. A data transmission system, comprising:
   a transmitting device configured to transmit a data signal;
   a receiving device configured to receive the data signal transmitted from the transmitting device; and
   a transmission path for transmitting the data signal from the transmitting device to the receiving device,
   the receiving device comprising:
      a detection unit configured to detect a timing at which a polarity of the received data signal is inverted;
      a plurality of resistors to be selectively connected to a terminal side of the transmission path; and
      a switching unit configured to switch the plurality of resistors based on the detected timing, wherein
   the switching unit is configured to select a first resistor of the plurality of resistors, the first resistor having a higher resistance value than a characteristic impedance of the transmission path, during a first period, which is a predetermined period from a time point at which the polarity is inverted, and to select a second resistor of the plurality of resistors, the second resistor having the same resistance value as the characteristic impedance, during a second period, which is a period from an end point of the first period until the polarity is inverted next.

2. The data transmission system according to claim 1, wherein in the received data signal, a signal level of the first period is higher than a signal level of the second period.

3. The data transmission system according to claim 2, wherein during the first period, the signal level of the first period is controlled to be higher than the signal level of the second period by causing the transmitted data signal to be reflected at a terminus of the transmission path.

4. The data transmission system according to claim 3, wherein impedance mismatching processing is performed during the first period and impedance matching processing is performed during the second period.

5. The data transmission system according to claim 1,
   wherein the transmission path comprises a first transmission line and a second transmission line, and
   wherein the data signal is a differential signal to be transmitted along the first transmission line and the second transmission line.

6. The data transmission system according to claim 1, wherein a resistor having the same resistance value as the characteristic impedance is connected to a terminus of the transmission path on the transmitting device side.

7. A receiving device, comprising:
   a receiving unit configured to receive a data signal transmitted from a transmitting device via a transmission path;
   a detection unit configured to detect a timing at which a polarity of the received data signal is inverted;
   a plurality of resistors to be selectively connected to a terminal side of the transmission path; and
   a switching unit configured to switch the plurality of resistors based on the detected timing, wherein
   the switching unit is configured to select a first resistor of the plurality of resistors, the first resistor having a higher resistance value than a characteristic impedance of the transmission path, during a first period, which is a predetermined period from a time point at which the polarity is inverted, and to select a second resistor of the plurality of resistors, the second resistor having the same resistance value as the characteristic impedance, during a second period, which is a period from an end point of the first period until the polarity is inverted next.

* * * * *